United States Patent [19]
Rosso

[11] 3,820,400
[45] June 28, 1974

[54] SEAL
[75] Inventor: John B. Rosso, Tulsa, Okla.
[73] Assignee: Combustion Engineering, Inc., New York, N.Y.
[22] Filed: Feb. 20, 1973
[21] Appl. No.: 333,832

[52] U.S. Cl. .............................. 73/398 R, 73/407
[51] Int. Cl. .............................................. G01l 9/10
[58] Field of Search................. 73/398 R, 407, 395; 336/30

[56] References Cited
UNITED STATES PATENTS
3,147,454    9/1964    Epstein ................................ 336/30

Primary Examiner—Donald O. Woodiel
Attorney, Agent, or Firm—Arthur L. Wade

[57]  ABSTRACT

A metallic diaphragm sandwiched between opposed faces of two massive blocks is exposed to differential fluid pressures. Electromagnetic coils are mounted in recesses in the opposed faces of the blocks so that their reluctance is changed by deflection of the diaphragm. The coils are isolated from the fluid by a sheet of impervious material sealed into a recess, or groove, about each coil with a body of O-ring form.

4 Claims, 3 Drawing Figures

SEAL

BACKGROUND OF THE INVENTION

1. Field of the Invention

This invention relates to control of high fluid pressure in the primary elements of systems measuring the pressure. More specifically, the invention provides a way to anchor a flexible sheet of impervious material so as to effectively isolate an electromagnetic coil of a pressure cell from the fluid whose pressure moves the diaphragm and thereby prevents flow of the fluid up the passage through which electrical wires are extended between the coil and read-out equipment.

2. Description of the Prior Art

Over the past several years, there have been attempts to develop a simple primary element for instruments measuring pressure and differential pressure. One design has evolved around two simple clamping blocks with a flat metallic diaphragm sandwiched between them.

The metallic diaphragm is the only moving part in this primary element. The deflection, or movement, of the diaphragm is detected by the flux of electromagnetic coils mounted on cores recessed in the clamping blocks and on each side of the diaphragm.

The coils are conventionally connected as two arms of a balanced bridge network. A difference in pressure across the diaphragm causes this bridge to unbalance, i.e. the reluctance of the coils changes. Electronic circuitry connected to the bridge then converts this change to a standard electrical output signal, read as directly proportional to the pressure causing the movement of the diaphragm.

The present problem is that the prior art seals do not stop the high pressure fluid applied to the diaphragm from flowing to the coil and out the passages in the blocks for the electric wires to the bridge. This leakage cannot be tolerated.

Various adhesives for impervious sheets of material have been tried in the prior art. Eventually there has been a breakdown of this type of seal—rapidly enough to be completely impractical.

Thin, flexible, metallic membranes have been spot-welded over the E-core in the prior art. The spot welds have leaked.

SUMMARY OF THE INVENTION

A principal object of the invention is to positively seal the detector of a diaphragm movement from the pressure fluid applied to move the diaphragm.

Another object is to seal a flexible impervious sheet of material over an electromagnetic coil as the detector of diaphragm movement under fluid pressure.

The present invention contemplates a circular recess formed in the block about a recessed electromagnetic coil with a flexible and impervious sheet of material over the coil and sealed to the walls of the recess about the coil with an O-ring form of structure.

Other objects, advantages and features of this invention will become apparent to one skilled in the art upon consideration of the written specification, appended claims, and attached drawing, wherein;

Figure 1:
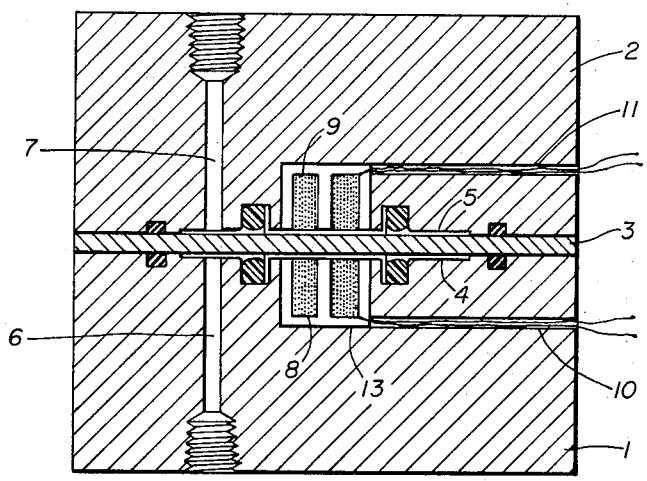
FIG. 1 is a sectioned elevation of two blocks with a diaphragm sandwiched between them to form a differential pressure cell including the present invention.
Figure 2:
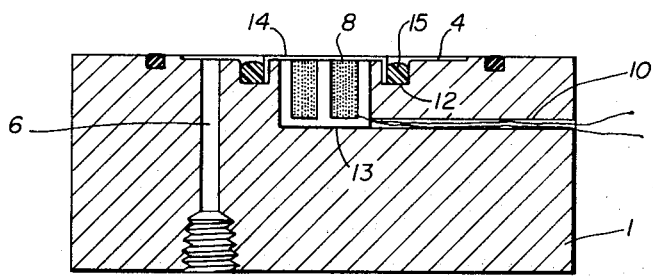
FIG. 2 is a sectioned elevation of the lower block of FIG. 1.
Figure 3:
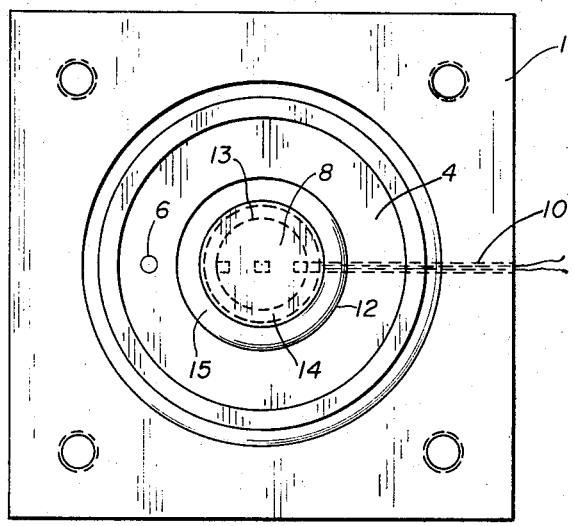
FIG. 3 is a plan view of the lower block of FIG. 1.

The drawing figures are simply of essential parts of a primary element responding to fluid pressure. The fluid pressure is of a relatively high order.

The great pressure is emphasized because it created the problem by breaking down prior art seals. The primary element is characterized by massive, solid metallic blocks 1 and 2. Diaphragm 3 is sandwiched between the opposed faces of these two blocks. A shallow recess, or depression, 4 is fomed in the face of block 1 and a matching recess 5 is formed in the face of block 2.

Fluid pressure is applied to the lower face of diaphragm 3 through passage 6 in block 1. Fluid pressure is applied to the upper face of diaphragm 3 through passage 7 in block 2. If there is a differential between the two pressures, the diaphragm 3 will move. If the pressure of passage 6 is greater than the pressure of passage 7, diaphragm 3 will flex into recess 5. This movement will be sensed by the coils 8 and 9.

The coils 8 and 9, wound on so-called E-cores, are energized as part of an electric bridge. The flux they generate with the electrical energy is coupled through the diaphragm 3. The flux paths are changed by the movement of the diaphragm under the fluid pressure placed on its face. The bridge is unbalanced by the change and its circuit manifests the pressure related to diaphragm movement and flux path change.

The problem created by the high pressure of the fluid whose pressure is measured is evidenced by leakage of the fluid into the electromagnetic coils and through the block passages 10 and 11 through which electrical connections between the coils and their circuit extend. The fluid under pressure could be corrosive. The danger from corrosive fluid is obvious. But, whatever the reason, high pressure fluid which is being measured leaking into the coils and to the electronic circuits of which the coils are a part is undesirable. A series of bad results can be brought about by such leakage.

All the drawings are to be taken together to fully understand and appreciate the invention. A continuous groove 12 is formed in the face of block 1 and about the coil 8. Coil 8, mounted on its core, is set into its own recess 13. It is usually potted into place with epoxy. At present, these coils are wound on an E-core, so-called because of its general shape. However, the coil shape, and problem of setting it into its recess 13, are secondary, The invention centers about the continuous groove 12 placed about coil 8 and its recess 13.

Over the "island" formed by running groove 12 around coil recess 13 in the face of block 1 is placed a thin sheet of impervious material 14. Obviously, this sheet 14 must be impervious to whatever high pressure fluid may be applied to the face of block 1. Also this material must be sufficiently flexible to fit down into groove 12 for sealing to its walls.

The seal of the sheet 14 to the walls of groove 12 is completed by 0-ring 15. This O-ring 15 is sized to fit down into groove 12 and press sheet 14 into sealing engagement with the walls of groove 12.

The sheet 14 may be of any material impervious to the fluid being measured, I will not risk limiting the definition of the invention by specifying particular material as preferred, although TEFLON is useful in many installations. Even metallic material can be used, providing it can also be formed thin enough to be pressed down into groove 12 and sealed effectively by O-ring 15.

O-ring 15 may also be of any material which can be formed to fit down into groove 12. Of course, it must also have the strength to press sheet 14 into sealing engagement with the walls of groove 12.

In the prior art, sheets of plastic have been glued over and around recess 13 in attempts to seal the high pressure fluid from the coil. Metallic sheets have been spot-welded about recess 13. All such attempts to isolate the coil from the fluid have failed. The present invention has been successful.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. A primary element for responding to a fluid pressure, including,
    a block adapted to connect with a similar block in capture of a metallic diaphragm between them,
    an electric coil mounted on a core and in a recess formed in the face of the block and parallel the diaphragm,
    a passageway in the block through which wires connected to the coil extend to connect to a means to manifest the pressure applied to the diaphragm,
    a continuous groove formed about the recessed coil,
    a flexible sheet of impervious material extended over the recessed coil and down into the continuous groove,
    and a seal body placed in the groove and arranged therein to seal the sheet to the walls of the groove.

2. The primary element of claim 1 wherein,
    the flexible sheet of impervious material is TEFLON.
3. The primary element of claim 2, wherein,
    the seal body is in the form of an O-ring and is of TEFLON.
4. The primary element of claim 1, wherein,
    the core is in E form and is potted in its recess with epoxy.

* * * * *